United States Patent
Pope et al.

(10) Patent No.: US 11,515,519 B2
(45) Date of Patent: Nov. 29, 2022

(54) GRAPHENE-POLYMER POROUS SCAFFOLD FOR STABLE LITHIUM-SULFUR BATTERIES

(71) Applicant: VoltaXplore Inc., Montreal (CA)

(72) Inventors: Michael Pope, Kitchener (CA); Debasis Ghosh, Panchgeria (IN); Yu Zhong, Saint-Laurent (CA); Soroush Nazarpour, Montreal (CA)

(73) Assignee: VoltaXplore Inc, Montreal (CA)

( * ) Notice: Subject to any disclaimer, the term of this patent is extended or adjusted under 35 U.S.C. 154(b) by 0 days.

(21) Appl. No.: 16/163,126

(22) Filed: Oct. 17, 2018

(65) Prior Publication Data

US 2019/0157665 A1 May 23, 2019

Related U.S. Application Data

(60) Provisional application No. 62/573,256, filed on Oct. 17, 2017.

(51) Int. Cl.
| | |
|---|---|
| H01M 4/36 | (2006.01) |
| H01M 4/1393 | (2010.01) |
| H01M 4/133 | (2010.01) |
| H01M 4/58 | (2010.01) |

(Continued)

(52) U.S. Cl.
CPC ......... *H01M 4/364* (2013.01); *H01M 4/0404* (2013.01); *H01M 4/133* (2013.01);
(Continued)

(58) Field of Classification Search
CPC .. H01M 4/663; H01M 4/9083; H01M 4/5815; H01M 4/133; H01M 4/1393;
(Continued)

(56) References Cited

U.S. PATENT DOCUMENTS

| | | | | |
|---|---|---|---|---|
| 2010/0081057 | A1* | 4/2010 | Liu | H01M 4/587 |
| | | | | 429/231.5 |
| 2013/0202945 | A1* | 8/2013 | Zhamu | H01G 11/50 |
| | | | | 429/156 |

(Continued)

OTHER PUBLICATIONS

Ghosh, D. et al., "Trapping and Redistribution of Hydrophobic Sulfur Sols in Graphene-Polyethyleneimine Networks for Stable Li—S Cathodes," Adv. Energy Mater., 8(27):1801979 (2018); DOI: 10.1002/aenm.201801979, 12 pages.

*Primary Examiner* — Jeremiah R Smith
(74) *Attorney, Agent, or Firm* — Cooley LLP

(57) ABSTRACT

A nanocomposite includes one or more graphene-based materials (GMs), a nitrogen-containing polymer (an N-polymer), and elemental sulfur (S). The nanocomposite is suitable for use as a stable, high capacity electrode for rechargeable batteries such as lithium-sulfur (Li—S) batteries. Example methods of fabricating a nanocomposite include the addition of an N-polymer to a dispersion (e.g., an aqueous dispersion) or slurry of GMs mixed with a sulfur sol. The N-polymer can interact strongly with the GMs to form a cross-linked network. In one embodiment, hydrothermal treatment of the aqueous dispersion or slurry is used to melt the sulfur such that it becomes distributed within the network formed by the GMs and the N-polymer. The resulting nanocomposite material can then be processed through the addition of one or more other binders and/or solvents, and formed into a final electrode.

25 Claims, 8 Drawing Sheets

(51) Int. Cl.
*H01M 10/052* (2010.01)
*H01M 4/60* (2006.01)
*H01M 4/62* (2006.01)
*H01M 4/139* (2010.01)
*H01M 4/38* (2006.01)
*H01M 4/04* (2006.01)
*H01M 10/0525* (2010.01)
*H01M 4/02* (2006.01)
*H01M 4/66* (2006.01)

(52) U.S. Cl.
CPC ......... *H01M 4/139* (2013.01); *H01M 4/1393* (2013.01); *H01M 4/38* (2013.01); *H01M 4/5815* (2013.01); *H01M 4/604* (2013.01); *H01M 4/622* (2013.01); *H01M 4/625* (2013.01); *H01M 10/052* (2013.01); *H01M 10/0525* (2013.01); *H01M 4/623* (2013.01); *H01M 4/663* (2013.01); *H01M 4/665* (2013.01); *H01M 2004/028* (2013.01)

(58) Field of Classification Search
CPC ........ H01M 4/583; H01M 4/625; H01M 4/70; H01M 4/72; H01M 4/74; H01M 4/364
See application file for complete search history.

(56) References Cited

U.S. PATENT DOCUMENTS

| | | | |
|---|---|---|---|
| 2014/0050992 A1* | 2/2014 | Panchenko | H01M 10/058 429/338 |
| 2014/0227548 A1* | 8/2014 | Myrick | C10L 1/28 428/570 |
| 2014/0356725 A1* | 12/2014 | Zaghib | H01M 4/625 429/231.5 |
| 2015/0246816 A1* | 9/2015 | Liu | H01M 4/0471 216/39 |
| 2015/0340696 A1* | 11/2015 | Son | H01M 4/604 429/199 |
| 2016/0149218 A1* | 5/2016 | Liu | H01M 4/364 429/335 |
| 2016/0200850 A1* | 7/2016 | Hatanaka | H01B 1/24 429/245 |
| 2017/0203969 A1* | 7/2017 | Sinh | C01B 32/184 |
| 2017/0226269 A1* | 8/2017 | Galimberti | C08G 18/3844 |
| 2018/0083266 A1* | 3/2018 | Zhamu | H01M 4/0416 |
| 2018/0123133 A1* | 5/2018 | Muldoon | H01M 4/382 |
| 2018/0351166 A1* | 12/2018 | Chen | H01M 4/38 |
| 2020/0014029 A1* | 1/2020 | Zhang | H01M 4/622 |

* cited by examiner

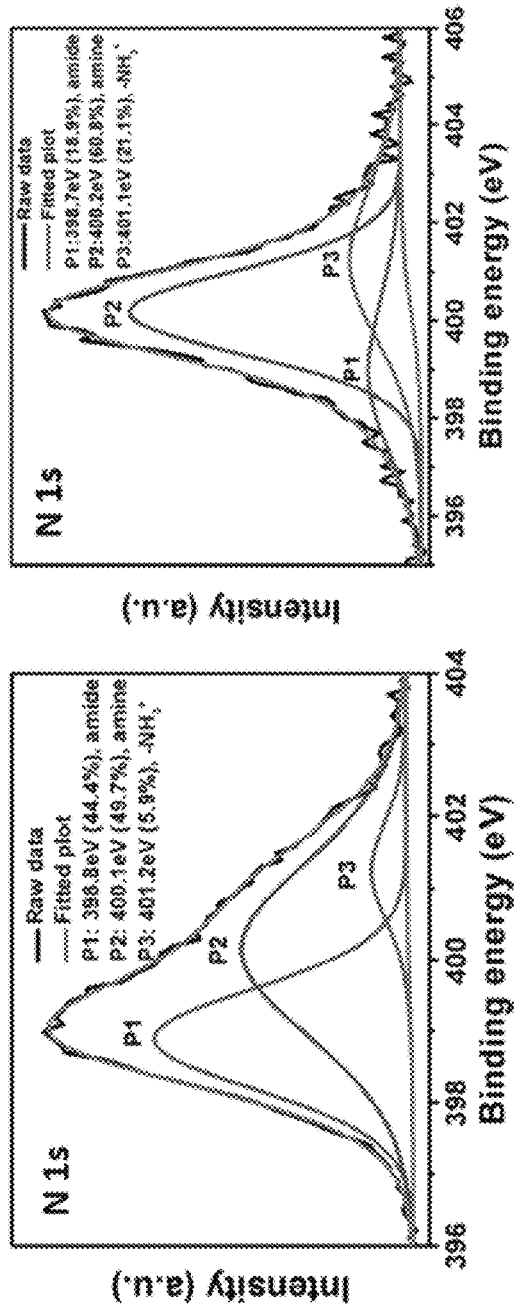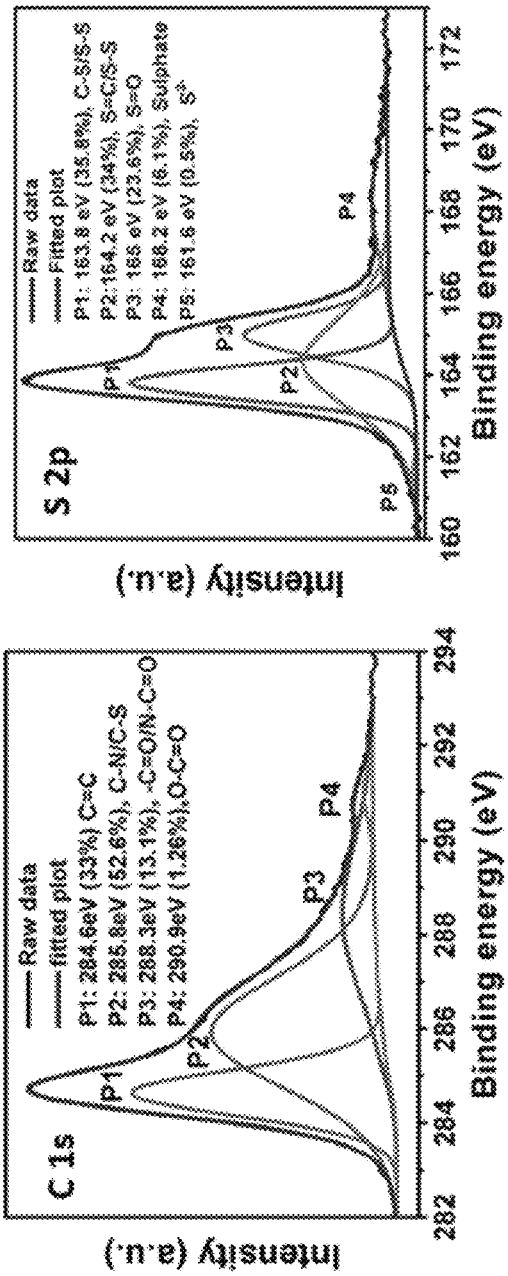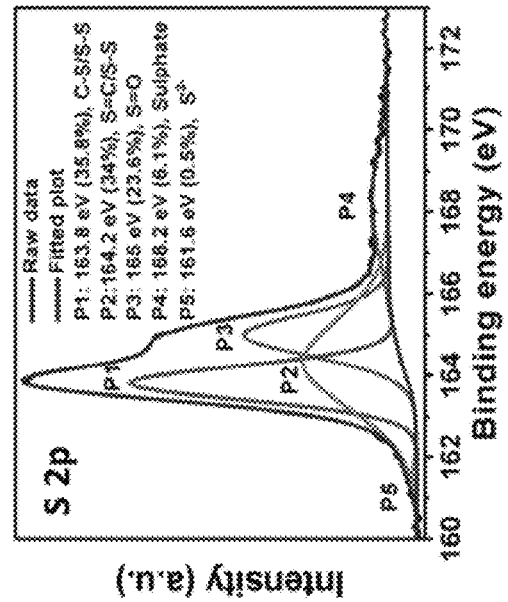

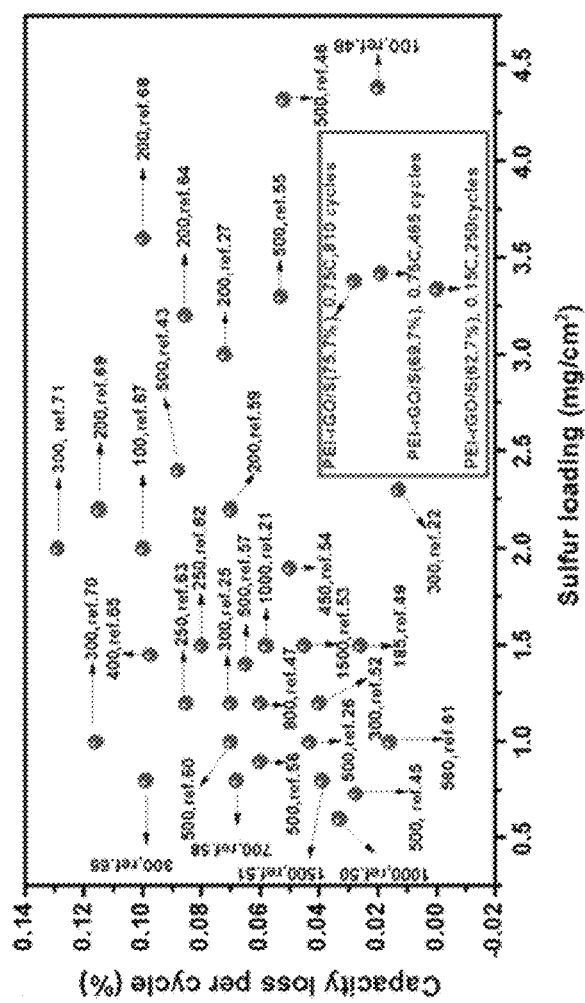
FIG. 8A
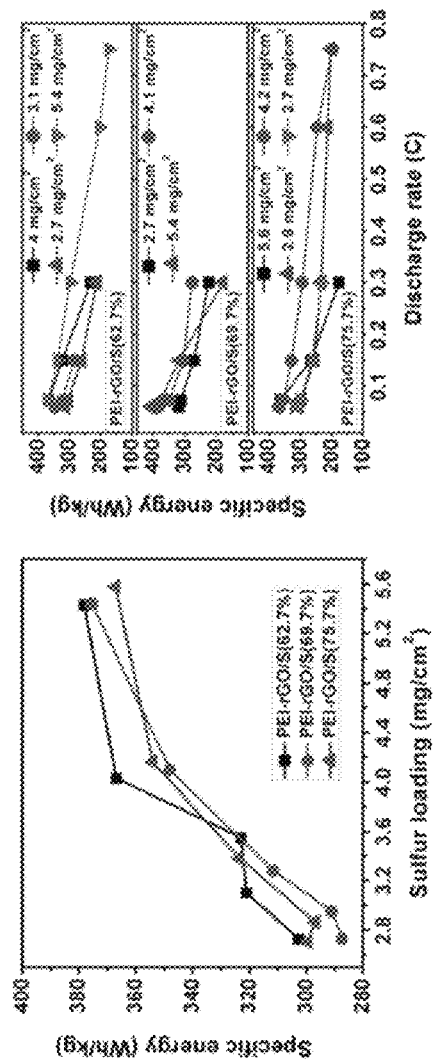
FIG. 8B
FIG. 8C

GRAPHENE-POLYMER POROUS SCAFFOLD FOR STABLE LITHIUM-SULFUR BATTERIES

CROSS-REFERENCE TO RELATED APPLICATIONS

This application claims priority to, and the benefit of U.S. Provisional Application No. 62/573,256 filed on Oct. 17, 2017, titled "GRAPHENE-POLYMER POROUS SCAFFOLD FOR STABLE LITHIUM SULFUR BATTERIES," the content of which is incorporated herein by reference in its entirety.

BACKGROUND

Recently, rechargeable lithium ion (Li-ion) batteries have been favored as an energy storage technology, due to their high energy density, long cycle life and low self-discharge rate. Li-ion batteries are widely used in many applications, including portable electronics, stationary energy storage and, more recently, electric vehicles.

SUMMARY

In some embodiments of the present disclosure, a nanocomposite includes one or more graphene-based materials (GMs), a nitrogen-containing polymer (an N-polymer), and elemental sulfur (S). The nanocomposite is suitable for use as a stable, high capacity electrode for rechargeable batteries such as lithium-sulfur (Li—S) batteries. Example methods of fabricating a nanocomposite include the addition of an N-polymer to a dispersion (e.g., an aqueous dispersion) or slurry of GMs mixed with a sulfur sol. The N-polymer can interact strongly with the GMs to form a cross-linked network. In one embodiment, hydrothermal treatment of the aqueous dispersion or slurry is used to melt the sulfur such that it becomes distributed within the network formed by the GMs and the N-polymer. The resulting nanocomposite material can then be processed through the addition of one or more other binders and/or solvents, and formed into a final electrode by one or more of: slurry casting, powder pressing, calendaring, or other electrode fabrication procedures known by those skilled in the art.

In some embodiments, a cathode for use in a lithium-sulfur (Li—S) battery comprises a graphene material (GM) including one of: graphene, graphene oxide (GO), partially reduced GO, and functionalized graphene. The cathode also comprises a nitrogen-containing polymer (N-polymer) and sulfur (S). The sulfur can be distributed throughout a porous scaffold formed by the GM and the N-polymer. The N-polymer has a high density of a nitrogen-containing group comprising one of: PEI, poly (diallyl dimethyl ammonium chloride), poly(vinylamine)hydrochloride, poly(allylamine), polyaminostyrene, chitosan, or poly(1-lysine). The N-polymer can have a molecular weight between about 100 Da and about 10 MDa (e.g., between about 1 kDa and about 1 MDa). The sulfur can comprise one of: elemental sulfur or a sulfur-containing reagent.

In some embodiments, a method of forming a nanocomposite cathode comprises combining a GM, an N-polymer, and sulfur to form a mixture; and forming the mixture into a nanocomposite cathode. The GM can include a functionalized graphene, the method further comprising chemically treating graphene to produce the functionalized graphene. Functionalized graphene can be in the form of partially reduced graphene oxide (GO), carboxylated, carbonylated, epoxide-functionalized graphene, hydroxylated graphene, or amine functionalized graphene, which have shown promising characteristics as an effective Li—S cathode component with both high specific capacity and acceptable cycle life. Chemical treatment can include acid treatment and/or nitrogen doping. Combining the GM, the N-polymer and the sulfur comprises dry mixing (e.g., high energy milling, shear mixing, or extrusion). In some such embodiments, the combining comprises dry mixing of the GM and the N-polymer, followed by addition of sulfur. The dry mixing can be performed for a duration of from about 1 hour to about 100 hours; at a speed of about 5 rpm to about 1000 rpm; and at a temperature from about 20° C. to about 80° C. The addition of sulfur can be performed by one of high energy milling and shear mixing, for a duration of from about 1 hour to about 100 hours, at a speed of about 5 rpm to about 1000 rpm, and at a temperature from about 20° C. to about 80° C. In some embodiments, a conductive additive can be added to the mixture.

In some embodiments, the sulfur is elemental sulfur, and the combining comprises: forming a first solution with the GM and deionized water (e.g., to a GM concentration of from about 0.5 mg/ml to about 10 mg/ml, or from about 1 mg/ml to about 4 mg/ml); forming a second solution with the N-polymer and deionized water (e.g., by dissolving the N-polymer in deionized water, to an N-polymer concentration of from about 1 mg/ml to about 40 mg/ml, or from about 10 mg/ml to about 20 mg/ml); and mixing the first solution and the second solution with a dispersed solution that includes the elemental sulfur. The dispersed solution can be prepared, for example, by dissolving the sulfur in one of dimethyl sulfoxide (DMSO) or tetrahydrofuran (THF) to form the dispersed solution (e.g., to a sulfur concentration of from about 5 mg/ml to about 60 mg/ml, or from about 20 mg/ml to about 40 mg/ml). Forming the solution with the GM can include dispersing the GM in a polar solvent such as deionized water. The polar solvent can comprise a surfactant including one of: sodium dodecyl sulfate (SDS), sodium dodecyl benzene sulfonate (SDBS), polyvinylpyrrolidone (PVP), or polyvinyl alcohol (PVA).

In some embodiments, the forming the mixture into a nanocomposite cathode is performed by heat treatment, for example in a controlled Ar atmosphere. The heat treatment can be performed at a heat treatment temperature from about 120° C. to about 200° C., or between about 130° C. and about 180° C. A duration of the heat treatment can be from about 6 hours to about 24 hours, or from about 10 hours to about 20 hours. The forming can be performed by a hydrothermal reaction, and a reaction temperature of the hydrothermal reaction is from about 130° C. to about 240° C., or from about 150° C. to about 200° C. A duration of the hydrothermal reaction can be from about 6 hours to about 24 hours, or from about 10 hours to about 20 hours.

In some embodiments, a method of forming a nanocomposite cathode further comprises adjusting a pH value of the mixture to about 8. The combining can include precipitating elemental sulfur from a sulfur-containing chemical reagent (e.g., $Na_2S_2$). The precipitating can be performed by a chemical redox reaction.

Improved battery performance was observed with polar hosts capable of chemically interacting with the polar lithium polysulfides (LiPSs), which are more effective in capturing the polysulfides. Heteroatom doped graphene, with the induced polarity by the heteroatom doping, could stabilize the cathode by chemically interacting with the intermediate polysulfides during the charge and discharge of the cell. Nevertheless, improvement to the cycle life is limited as the electronic conductivity is affected by the low upper threshold of heteroatom doping to the graphitic lattice. Functionalized graphene in the form of partially reduced graphene oxide (GO), carboxylated, carbonylated, epoxide-functionalized graphene, hydroxylated graphene, or amine functionalized graphene has shown promising characteristics as an effective Li—S cathode component with both high specific capacity and acceptable cycle life. Moreover, due to the inherent disorder induced by the addition of the functional group to the graphitic lattice, the chemical properties of the functionalized graphene can be tailored to mitigate the major obstacles of Li—S in terms of both poor sulfur utilization and low stability.

BRIEF DESCRIPTION OF THE DRAWINGS

FIGS. 4A-4D show high-resolution XPS spectra of N is of (a) PEI-GO/S; and high resolution XPS spectra of (b) N is, (c) C is, and (d) S 2p of PEI-rGO/S composite, according to embodiments.

FIGS. 8A-8C show (a) plot of sulfur loading versus capacity loss per cycle for this work versus other reports (number of maximum cycles investigated are shown by an arrow); (b) the estimated practical specific energy of PEI-rGO/S cells with different sulfur content and loading at discharge rate of ≈0.074 C; and (c) variation of estimated mass specific energy as a function of discharge rate for the PEI-rGO/S cells, according to embodiments.

DETAILED DESCRIPTION

Figure 1:
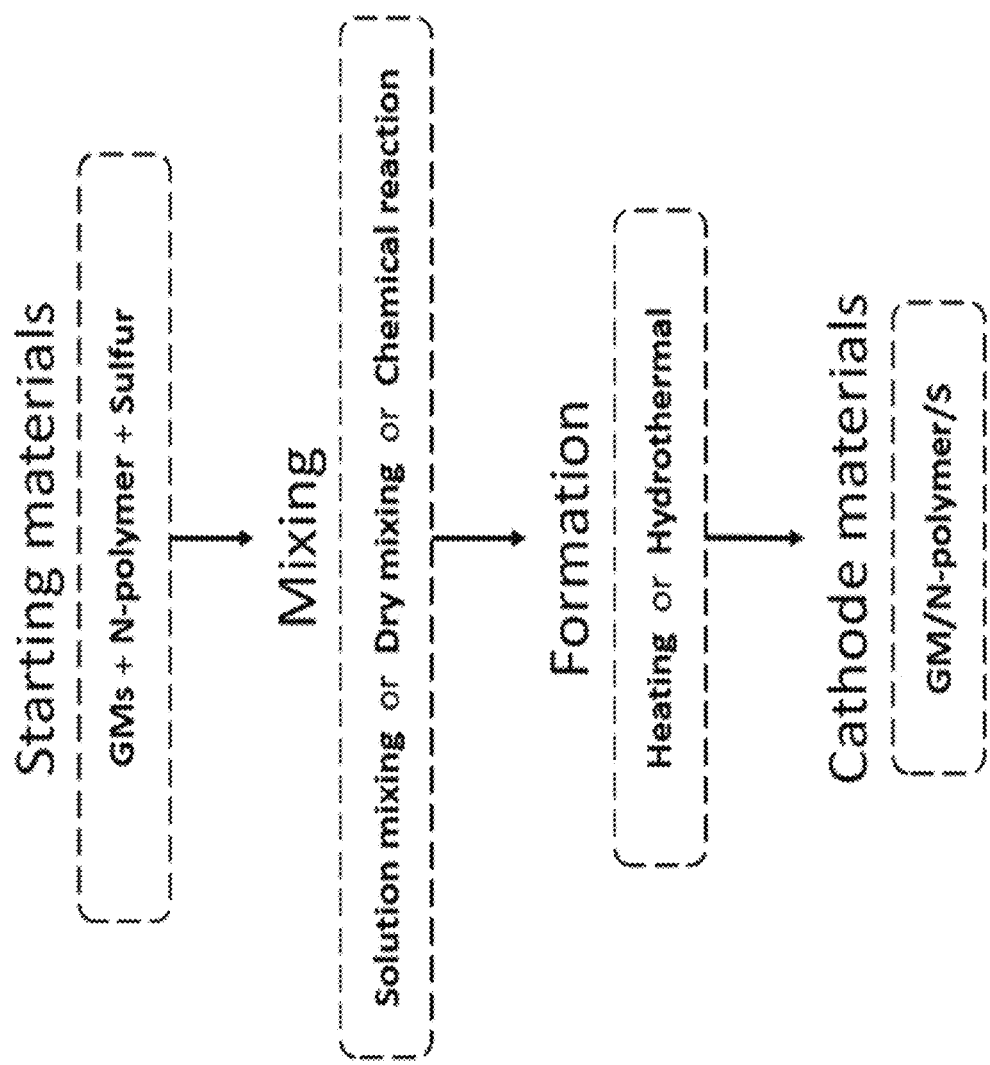
FIG. 1 shows a flowchart of a manufacturing process for GM/N-polymer/S cathode materials, according to embodiments.

As global energy demand grows, higher energy density and longer life time are desirable for various applications, especially by electric vehicles. However, the energy density of current Li-ion batteries is only around 200 Wh/kg, which limits the performance of these batteries.

Compared with conventional Li-ion batteries, lithium-sulfur (Li—S) batteries have attracted significant attention due to their higher theoretical energy density (2600 Wh/kg). The theoretical specific capacity of sulfur is 1672 mAh/g, which is much higher than that of conventional cathode materials in Li-ion batteries, such as $LiCoO_2$ and $LiFePO_4$, which have been extensively used. Furthermore, sulfur is abundant in nature and low in cost. These attributes make Li—S batteries one of the most promising next-generation battery technologies.

While some promising results have been achieved so far, there remains a need to fabricate a stable high capacity sulfur cathode with focus on high sulfur loading to deliver high practical energy density. More recently, more polar conductive hosts and those capable of strong Lewis acid-base interactions beyond carbonaceous materials have been explored to further enhance the interactions between the host and polysulfides. For example, conducting polymers, transition metal hydroxides, oxides and sulfides, or host materials with Lewis acidic behavior (e.g., Mxenes, metal organic frameworks, etc.) have all been shown to significantly improve the cycle life of Li—S batteries. Although Li—S batteries offer many advantages, commercialization has been hindered due to several challenges inherent to sulfur chemistry: (i) the poor electrical conductivity of sulfur; (ii) the dissolution of intermediate lithium polysulfides (LiPSs) into the organic electrolyte; and (iii) the volume change of sulfur (~80%) during the battery charge/discharge process. The electrical conductivity of sulfur is $5\times10^{-30}$ S/cm at 25° C. The poor electrical conductivity has led to the use of high surface area conductors to more effectively distribute electronic charge to/from the insulating material.

While cycling the sulfur cathode, LiPSs are formed and then dissolve into the organic electrolyte and diffuse away from the cathode. LiPSs can travel (or "shuttle") through the electrolyte and deposit on the anode, causing depletion and eventual failure of the sulfur cathode. This shuttle effect is irreversible, and leads to rapid capacity loss and to an increase of the internal resistance of the cell.

To address these challenges, significant efforts have been devoted to the development of more stable cathodes (both in terms of LiPS shuttling, and of the large volume expansion during discharge). A popular way to improve the electrical conductivity of sulfur is to introduce materials with high electrical conductivity, such as mesoporous carbons, carbon nanotubes (CNTs) and graphene-based materials. Additionally, to mitigate the "shuttle effect," physical and chemical methods can be used. In a physical confinement method, sulfur can be melted such that it diffuses into materials with a porous structure. The LiPSs can be physically trapped in the pores, e.g., through non-specific interactions between the carbon and LiPSs. In a chemical method, atoms (e.g., N, O) and functional groups that form specific interactions (e.g., Lewis acid/base interactions, hydrogen bonding, etc.) with the LiPSs are introduced into the cathode. These stronger bonds can also limit the shuttle effect. However, the large volume change of sulfur when converted to lithium sulfide ($Li_2S$) can lead to pulverization of the cathode and fading performance due to poor electrical contact. The development of robust, porous 3D frameworks which provide void space and mechanical integrity to buffer the volume change is desirable to further enhance cycle-life. Although recent research and development has focused on new carbon materials like carbon nanotubes (CNTs) to form porous structures to confine LiPSs through physical confinement and to improve the electrical conductivity, it remains a challenge to build a stable cathode that can be cycled many hundreds of times, as is desirable for practical applications. Innovative structures and materials disclosed herein can improve the properties of sulfur cathodes and enhance their electrochemical performance, rendering them more suitable for commercial applications.

Embodiments of the present disclosure include high-performance Li—S battery cathodes with high practical energy density and exceptional cycle life by taking advantage of a cross-linked network of PEI-modified, partially reduced graphene oxide, flexible scaffold with uniformly distributed sulfur inside it, synthesized via a modified hydrothermal method. The functionalized graphene does not only chemically interact with the intermediate polysulfides, but the cross-linked structure also provides strong mechanical support against the large volume change of sulfur during the redox process from charge to discharge. All these effects work together to deliver a high specific energy (407 Wh $kg^{-1}$). More importantly, the PEI-rGO/S cathode showed exceptionally high cycle stability of only 0.013% capacity loss per cycle over 660 cycles and 0.028% capacity loss per cycle over 810 consecutive cycles. The scalability of the process accompanied by exciting electrochemical performance makes our as prepared PEI-rGO/S composite suitable as an efficient Li—S battery cathode for practical application.

Embodiments of the present disclosure are directed to compositions of high energy density electrodes for secondary (i.e., rechargeable) batteries, and methods for producing such compositions. The methods provide scalable means for producing nanocomposites from a graphene-based material (GM), a nitrogen-containing polymer (N-polymer), and elemental sulfur. A cross-linked network, formed by the N-polymer and the GMs via chemical bonds, provides a high specific surface area (for example graphene has a specific surface area as high as 2630 $m^{-2}/g$) for sulfur accommodation, such that a high specific capacity and energy density can be achieved. The cross-linked network effectively mitigates the dissolution of lithium polysulfides (LiPSs) formed during the charge/discharge process due to the interaction between polysulfides and the free amino/protonated amine units of the polymers. In other words, the porous, cross-linked network structure enhances the cycle stability of Li—S batteries by preventing sulfur to dissolve into the electrolyte. The resulting nanocomposites are suitable for use as a cathode in a lithium-sulfur (Li—S) battery, and such implementations have been demonstrated to exhibit a high energy density and exceptional cycle life.

In some embodiments, a nanocomposite electrode material for rechargeable battery applications includes sulfur as a high capacity active material, a ternary mixture of graphene-based materials (GMs) as the conductive scaffold, a polymer with a high density of nitrogen-containing groups such as polyethyleneimine (PEI) as an efficient LiPSs scavenger, and inexpensive elemental sulfur as a precursor.

In the starting materials, highly branched polymer materials with nitrogen-containing groups (N-polymers) are used to mitigate the shuttle effect of LiPSs by interactions between nitrogen-containing groups and LiPS. The polymer can have a molecular weight between about 100 daltons (Da) and about 10 MDa, more preferably between about 1 kDa and about 1 MDa. For example, a polyethyleneimine (PEI) dendrimer containing a large amount of branching with many end groups of primary amines can form the most interactions with both the graphene surface (for enhanced mechanical stability) and the most active sites for bonding with polar LiPSs. Other amine-containing polymers, such as poly(diallyl dimethyl ammonium chloride), poly(vinylamine) hydrochloride, poly(allylamine), polyaminostyrene, chitosan, poly(llysine) or other suitable materials known to those skilled in the art, can also be used.

In addition to the reduction of polysulfide shuttling, another important aspect of building better Li—S batteries is to improve the mechanical stability of the cathode. This could be efficiently realized in a flexible host structure capable of strong multidentate interactions with LiPSs. In this respect, polyamines, such as ethylenediamine (EDA) and polyethyleneimine (PEI), can covalently interact with both polar LiPSs and functionalized carbon as well as the nonpolar regions of the carbon surface and provide both chemical and mechanical stability to the cathode. For example, EDA functionalized reduced graphene oxide (rGO) with highly reactive amine functionality could covalently interact with both polar LiPSs and the nonpolar carbon surface of reduced graphene oxide leading to a high cycle life Li—S battery with only 0.044% capacity loss per cycle over 350 cycles at 0.5 C. Other tests show only 0.07% capacity loss per cycle over 300 cycles at 0.5 C for a PEI modified CNT-based sulfur host. However, the reported cycle life is only for a low loading (1.2 mg $cm^{-2}$) of sulfur. It has been demonstrated a strong covalent interaction of 2.4 eV between dissolved $Li_2S_6$ and PEI by density functional theory calculation. Experimentally, it has been demonstrated how a catholyte infiltrated in such N-rich polyamine modified CNT-rGO aerogel electrode (loaded to 1 mg $cm^{-2}$) showed a capacity loss of only 0.043% per cycle over 500 cycles. It has also been reported that an amino functionalized membrane separator prepared by the polymerization of PEI with hexamethylene diisocyanate was found to stabilize an electrode composed of a commercial sulfur powder. In this case, only 0.072% capacity loss per cycle over 200 cycles at 0.5 C and a high sulfur loading of 3 mg $cm^{-2}$. However, the specific capacity loss per cycle increased to 0.12% after only 50 cycles when the cell was discharged at a lower rate of 0.2 C.

Disclosed herein is an approach that uses networks of cross-linked polyethyleneimine and partially reduced graphene oxide as an effective host for sulfur as well as an excellent polysulfide reservoir. In basic medium, PEI with high amine density is capable of cross-linking GO and capturing hydrophobic sulfur sols within the GO-PEI framework. Low temperature, hydrothermal treatment (180° C.) was found effective at simultaneously reducing the GO and distributing the sulfur within the PEI-rGO network. Although this temperature is high enough to dissolve sulfur, 180° C. can be considered as low temperature when the reduction of GO to rGO is concerned. In many cases, rGO is reduced around 1100° C. or using chemical reducing agents that must be washed from the material prior to mixing sulfur. The approach disclosed herein bypasses these processes which should reduce manufacturing costs. Using this method, the sulfur and PEI also act as spacer to maintain the high surface area of rGO by preventing restacking. The high surface area and the ability of the hydrothermal method to evenly distribute sulfur within the network are supported by high initial capacities of up to 1150 mAh g$^{-1}$ at the sulfur loading of 3.1 mg cm$^{-2}$ and 954 mAh g$^{-1}$ even at loading as high as 5.4 mg sulfur per cm$^{-2}$. The composite is found to yield exceptional cycle stability at both low (0.15 C, 100% capacity retention for ≈3.4 mg cm$^{-2}$ sulfur loading, tested up to 250 cycles) and high discharge rates (0.75 C, 0.028% capacity loss per cycles over 810 cycles with ≈3.4 mg cm$^{-2}$ sulfur loading). These results constitute one of the best cycle stabilities reported for moderate sulfur loadings. Cell failure beyond 800 cycles was found to be due to electrolyte depletion caused by a ≈60-100 μm thick layer of porous lithium that developed at the anode during repetitive charging cycles.

In some embodiments, GMs are used to form conductive scaffolds that accommodate sulfur. The GMs can include materials which are nearly 100% single atomic layers or materials which are composed of a mixture of single and few-layer (2-5) or thicker multi-layer stacks (5-20) and one or more functional groups on the surface to interact with the N-polymers. The graphene-based materials can be one or more of: pure graphene, graphene oxide (GO), partially reduced GO, and functionalized graphene. The functionalized graphene can be obtained, for example, by doping nitrogen into a graphene lattice or by treating the graphene lattice with one or more acids.

Sources of sulfur can include elemental sulfur or a sulfur-containing reagent (e.g., $Na_2S_2$). The sulfur source can be introduced into the nanocomposite with various methods. For example, elemental sulfur can be directly added due to its abundance and low cost. The elemental sulfur powder can be mixed with the GMs and N-polymers by dry-mixing techniques, such as high energy milling, shear mixing and extrusion. In some such embodiments, the GMs and N-polymers are initially mixed by one or more dry-mixing methods, and subsequently mixed with sulfur by high energy milling or shear mixing. The duration of dry-mixing (e.g., high energy milling, shear mixing, and/or extrusion) can vary from about 1 hour to about 100 hours (e.g., from about 5 hours to about 40 hours), at speeds ranging from about 5 rpm to about 1000 rpm (e.g., from about 100 rpm to about 600 rpm), in a temperature range from about 20° C. to about 80° C. (e.g., from about 20° C. to about 60° C.). When adding sulfur, the conditions of high energy milling or shear mixing can be in accordance with dry-mixing. During the process, conductive additives such as CNTs and carbon black can also be added.

In another exemplary method, sulfur is dissolved in a suitable solvent such as hot dimethyl sulfoxide (DMSO) or tetrahydrofuran (THF) with a sulfur concentration of about 5 mg/ml to about 60 mg/ml, more preferably between about 20 mg/ml and about 40 mg/ml, and crashed into an aqueous dispersion of GMs (e.g., about 0.5 mg/ml to about 10 mg/ml, more preferably between about 1 mg/ml and about 4 mg/ml). A surfactant such as sodium dodecyl sulfate (SDS) can be added to achieve well-dispersed solution of GMs. Then, the N-polymer aqueous solution (e.g., about 1 mg/ml to about 40 mg/ml, more preferably between about 10 mg/ml and about 20 mg/ml) is added. The pH value of the resulting solution can then be adjusted to about 8 (e.g., via the addition of NaOH). In this solution method, a sulfur sol forms that can deposit onto and uniformly coat the surface area of the dispersed GMs.

In still another method, a sulfur-containing chemical reagent can be used to precipitate sulfur via a chemical redox reaction. The precipitated sulfur is then used as the active cathode material.

Once the starting materials of GMs, N-polymer and sulfur have been mixed, a cathode nanocomposite can be formed by any one of various methods. For example, in some embodiments, the nanocomposite can be obtained by directly heating the mixture of materials in an Argon (Ar) atmosphere. In this case, the heat treatment distributes the sulfur evenly within the pore-space of the GMs/N-polymer network by melt imbibition, which involves heating the sulfur to a temperature that is close to its melting point. The temperature can be from about 120° C. to about 200° C., more preferably between about 130° C. and about 180° C., since at these temperatures the sulfur is readily drawn into the porous material by capillary forces. The duration of heat treatment can be from about 6 hours to about 24 hours, or between about 10 hours and about 20 hours.

In other embodiments, the nanocomposite can be formed using a hydrothermal method carried out, for example, in a stainless steel autoclave. Such methods are also effective at dispersing the sulfur evenly throughout the GMs/N-polymer network, and can lead to more interaction between the GMs and the N-polymer while limiting loss of sulfur by sublimation. The temperature of hydrothermal reaction can be from about 130° C. to about 240° C., more preferably between about 150° C. and about 200° C. The duration of the hydrothermal reaction can be from about 6 hours to about 24 hours, for example between about 10 hours and about 20 hours.

Further embodiments of the disclosed nanocomposites and related methods are shown and described below via experimental examples and with reference to the FIGs.

FIG. 1 shows a flowchart of a manufacturing process for GM/N-polymer/S cathode materials, according to an embodiment. As shown in FIG. 1, starting materials can include GMs, an N-polymer, and sulfur. The starting materials are mixed via one or more of: solution mixing, dry mixing, or chemical reaction, to form a nanocomposite mixture. Formation of the GM/N-polymer/S cathode is then performed, for example by heating or hydrothermal processing of the nanocomposite mixture.

Additional process and testing details can be found in *Adv. Energy Mater.* 2018, 1801979, pp. 1-12, Trapping and Redistribution of Hydrophobic Sulfur Sols in Graphene-Polyethyleneimine Networks for Stable Li—S Cathodes, the disclosure of which is hereby incorporated by reference in its entirety for all purposes.

Mechanisms of the Composite Formation

Example 1

Figure 2:
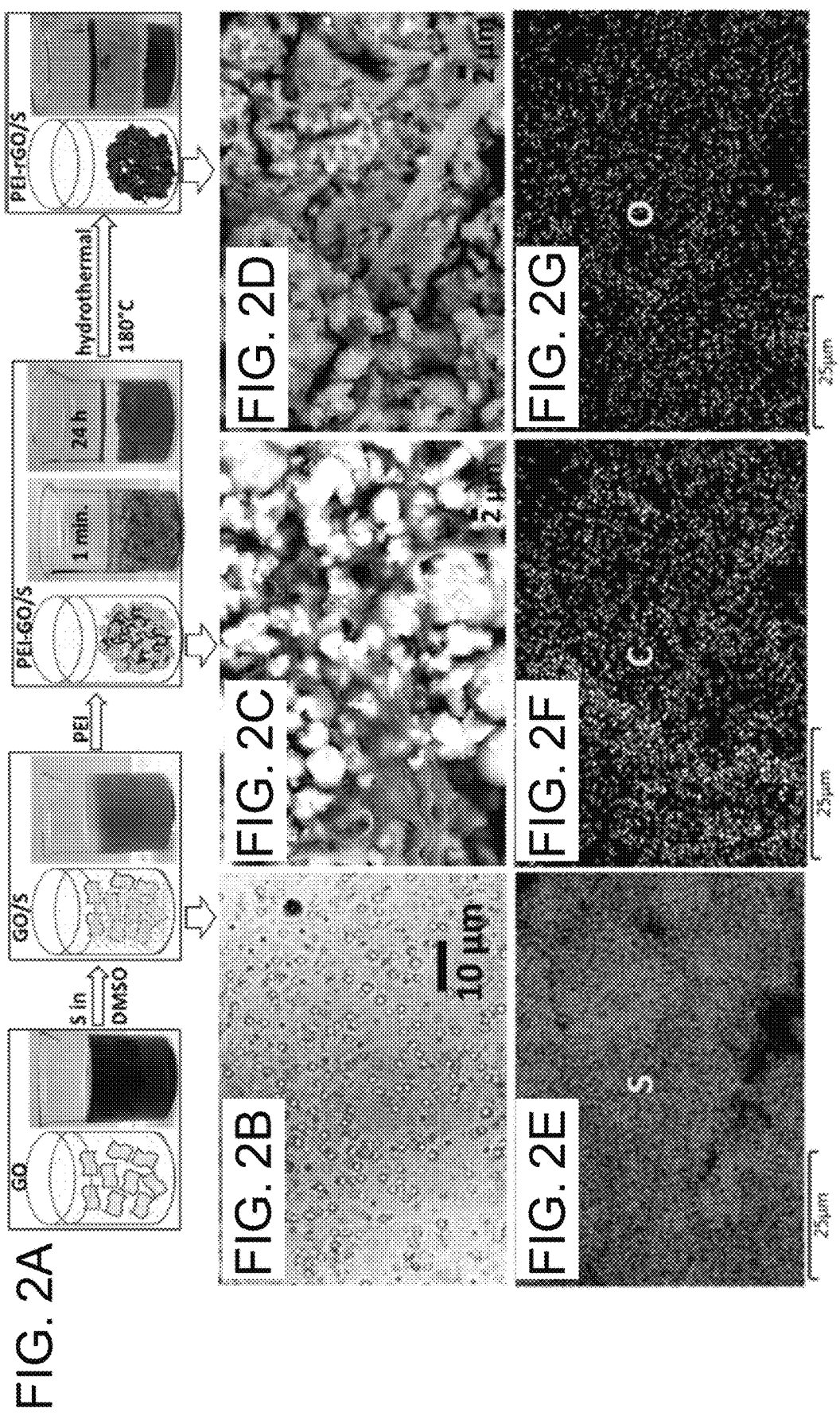
FIGS. 2A-2G show (a) schematic of the synthesis of PEI-rGO/S composite starting from the GO suspension following the addition of dissolved sulfur in DMSO, followed by modification with PEI and its hydrothermal treatment along with the digital images of these steps of the synthesis; (b) optical microscope image of the GO/S suspension showing the spherical sulfur particles; FESEM image of (c) PEI-GO/S before hydrothermal treatment; (d) PEI-rGO/S after hydrothermal treatment using the BSD detector; and EDS elemental mapping of PEI-rGO/S composite showing the distribution of (e) sulfur, (f) carbon, and (g) oxygen, according to embodiments.

FIG. 2a illustrates the synthesis procedure for the PEI-rGO/S composite with digital images of the dispersion at different stages. In example implementations, graphene oxide (GO) as a graphene source was well-dispersed in deionized water to form an aqueous dispersion (from about 1 mg/ml to about 4 mg/ml). GO can be obtained, for example, through a Hummer's method, modified Hummers' method, Staudenmeier's method, Brodie's method or related chemistries which typically use a mixture of strong acid graphite intercalants ($H_2SO_4$, $H_3PO_4$, $HNO_3$, etc.) and oxidizing agents ($KClO_4$, $KMnO_4$, etc.).

Elemental sulfur as the active cathode material was dissolved in DMSO (20 to 40 mg/ml). When sulfur dissolved in hot dimethyl sulfoxide (DMSO) is injected into either water or an aqueous dispersion of GO, a milky white dispersion is formed. The sulfur solution was quickly added into the GO dispersion while stirring and left for about 0.5 hours to 1 hour to completely mix the materials. Due to the insolubility of sulfur in water, the sulfur precipitates into micrometer-sized particles when the dissolved sulfur is crashed into a majority water phase. These sulfur particles are known to exist in a liquid-like state and the resulting dispersions are referred to as Weimarn sols. As shown in FIG. 2b, optical microscopy confirms the presence of such sols, while the relatively transparent GO is not easily seen. Even in the presence of the GO, the sulfur particles are mobile, moving by Brownian motion, which suggests that they do not get adsorbed to the graphene oxide sheets. If this dispersion is allowed to sit for an extended period of time (>20 min-3 days), sulfur crystals are found to nucleate, presumably homogeneously, and sediment to the bottom of the beaker.

The pH of the solution was then adjusted to about 8. PEI as the N-polymer was dispersed into deionized water (about 10 mg/ml to about 20 mg/ml) and added into the GO/S solution while continuously stirring. Upon addition of PEI solution to the GO/S suspension at pH ≈8, the cationic polymer PEI bridges the negatively charged GO dispersion and causes the system to flocculate, capturing the amorphous sulfur particles in the cross-linked network formed. An effectively clear supernatant is observed within 1 min of addition of PEI surrounding the agglomerated PEI-GO/S.

The materials were washed with deionized water and transferred into a stainless steel autoclave for heat treatment by hydrothermal reaction. Prior to hydrothermal treatment, field emission scanning electron microscopy (FESEM) using the backscattered electron detector (BSD) indicated that the sulfur remained as quasispherical particles (bright areas) within the GO/PEI network as shown in FIG. 2c and did not distribute uniformly. In the SEM micrograph of the PEI-rGO/S composite after hydrothermal treatment at 180° C., these bright regions are no longer observed suggesting that the sulfur is uniformly distributed within the PEI-rGO composite. Elemental mapping by energy dispersive X-ray spectroscopy (EDS) as shown in FIGS. 2e-g also supports this conclusion.

The system temperature was then maintained at about 150° C. to about 200° C. until the hydrothermal reaction was completed (about 10 hours to about 20 hours, i.e., about 15 hours). The resultant materials were dried and formed into cathode materials having various sulfur contents (including 62.7 wt %, 69.7 wt %, and 75.7 wt %). The sulfur contents were varied by varying the weight ratios of GO to sulfur.

To understand the nature of the sulfur phase impregnated into the PEI-rGO structure during the hydrothermal process, Raman spectroscopy was carried out. The characteristic Raman peaks of elemental sulfur are at 156, 219, and 473 $cm^{-1}$, corresponding to S—S bond vibrations in elemental sulfur. The bands are also present in the PEI-GO/S composite. However, the peaks had very weak intensities in the PEI-rGO/S composites and could only be observed in some locations in the sample but could not be found in most locations about the sample. This indicates that sulfur is highly dispersed and mostly in an amorphous state throughout the PEI-rGO/S composite. The PEI-GO/S and PEI-rGO/S composites had two other significant peaks at ≈1353 and ≈1593 $cm^{-1}$ corresponding to the D band (breathing mode of aromatic rings within the graphene layers) and the G band, (Raman active E2g mode corresponding to sp2 hybridized carbon), respectively. The $I_D/I_G$ intensity ratio gradually increased from PEI-GO/S (1.75) to PEI-rGO/S with 2.55, 2.62, and 2.86, respectively, with increasing sulfur content from 62.7%, 69.7%, and 75.7%. If it is assumed that the lateral crystallite size in the rGO is larger than 2 nm, the increasing $I_D/I_G$ ratio indicates an increase in the defect density within the graphene structure likely induced by increasing the sulfur content and also suggesting a chemical interaction between rGO and sulfur. The amorphous nature of the sulfur in the PEI-rGO/S composite was also confirmed from the X-ray diffraction (XRD) pattern of the PEI-rGO/S composites. The characteristic sulfur peaks are mostly absent in the PEI-rGO/S (69.7%) composite, clearly indicating the amorphous nature of anchored sulfur on the rGO surface. However, in the PEI-rGO/S (75.7%) composite, while most of crystalline sulfur peaks are absent, a few low intensity sulfur peaks indicate the partial crystallization of sulfur anchored on the rGO surface within the composite. In the XRD pattern of PEI-rGO, the broad peak at 2θ of 25.9° can be assigned as the (002) plane of partially restacked rGO. Nevertheless, this graphitic peak cannot be seen in any of the PEI-rGO/S composites, clearly indicating the role of amorphous sulfur as spacer to inhibiting the restacking of rGO during the hydrothermal treatment.

The above observations clearly indicate the ability of the hydrothermal treatment to uniformly distribute sulfur within the PEI-rGO cross-linked network. Uniform impregnation of sulfur in carbon pores by a hydrothermal assisted method was also observed. The closed system is convenient because it prevents loss of sulfur through sublimation.

A pale yellow colored supernatant with a slight scent of H2S and acidic pH (≈2.3) is obtained after the hydrothermal reaction, which indicates that a fraction of the sulfur undergoes a self-disproportionation reaction during the hydrothermal treatment, likely following the reaction $4S+4H_2O\_3H_2S+H_2SO_4$ (1) Due to this potential reaction, the initial pH of the solution plays a significant role in limiting sulfur loss. A basic pH accelerates the reaction, whereas a neutral pH (in this case pH ≈6 using distilled water) could only result in partial disproportionation and thus limited sulfur loss. X-ray photoelectron spectroscopy (XPS) analysis was carried out to understand the nature of chemical interaction between the PEI, GO/rGO, and sulfur in the PEI-GO/S and PEI-rGO/S composites. The C:O:N ratios in the PEI-GO/S, PEI-rGO/S, and PEI-rGO composites were calculated as ≈67:26:7, ≈84:12:4, and ≈83:13:4, respectively. The increase in the C/O ratio in PEI-rGO/S and PEI-rGO composites after hydrothermal treatment of PEI-GO/S indicates the successful reduction of graphene oxide by the hydrothermal treatment.

The resultant materials were tested as cathodes in Li—S batteries. The composites were mixed with a conductive agent (e.g., carbon black) and a binder (e.g., polyvinylidene fluoride (PVDF)) with a weight ratio of 70:20:10 in N-methylpyrrolidone (NMP) to form a slurry. After drying under vacuum, the powders were pressed onto pre-cut aluminum (Al) foil using a stainless steel die to achieve various sulfur loadings. The cathodes were then assembled into coin cells against lithium metal anodes in a glovebox filled with Ar. The electrolyte included 1 M lithium bis(trifluoromethanesulfonyl)imide (LiTFSI) and 0.2 M lithium nitrate ($LiNO_3$) in 1,3-dioxolane and 1,2-dimethoxyethane (v:v=1:1). Li foil was used as an anode, and polypropylene was used as a separator. Galvanostatic charge/discharge tests were performed over a potential range from 1.5V to 3V at current rates ranging from 0.06 C to 1.5 C (where 1 C=1672 mA/g).

During the hydrothermal reaction in Example 1, the GO was partially reduced to form reduced graphene oxide (r-GO) while sulfur was uniformly distributed into the r-GO/PEI structure. Prior to the hydrothermal reaction, sulfur with a relatively large particle size (on the order of about 1 micron) was present in the GO/PEI/S composite, as shown in the FESEM image of FIG. 2c. After hydrothermal treatment was completed, the large sulfur particles diffused into pores of the r-GO/PEI structure and were no longer visible (see FESEM image of FIG. 2d). EDX elemental mapping results, shown in FIGS. 2e-2g (for S, C and O, respectively), of the r-GO/PEI/S sample after hydrothermal treatment confirm the uniform distribution of sulfur in the cathode.

Example 2

In another example implementation, PEI was used as an N-polymer, and graphene nanoplatets (GNPs) produced by exfoliation (chemical or physical) were used as a graphene source. Prior to mixing with PEI, the GNPs were functionalized by acid treatment to enhance their interaction with the PEI. The GNPs were mixed with acids (e.g., nitric acid ($HNO_3$)). Then, the acid-modified GNPs were mixed with PEI at various weight ratios (about 1 wt. % to about 30 wt. % PEI). The elemental sulfur was added and completely mixed, with weight ratios ranging from about 10 wt % to about 70 wt %, by high energy milling. The well-mixed materials were transferred into a stainless steel autoclave filled with Ar. The materials were heated in an autoclave and held at a temperature of 130° C. to 180° C. for hours (about 10 hours to about 20 hours, i.e., about 15 hours). The materials collected from the autoclave were used to prepare cathodes, and were tested following a similar procedure to that described above with reference to Example 1.

Figure 3:
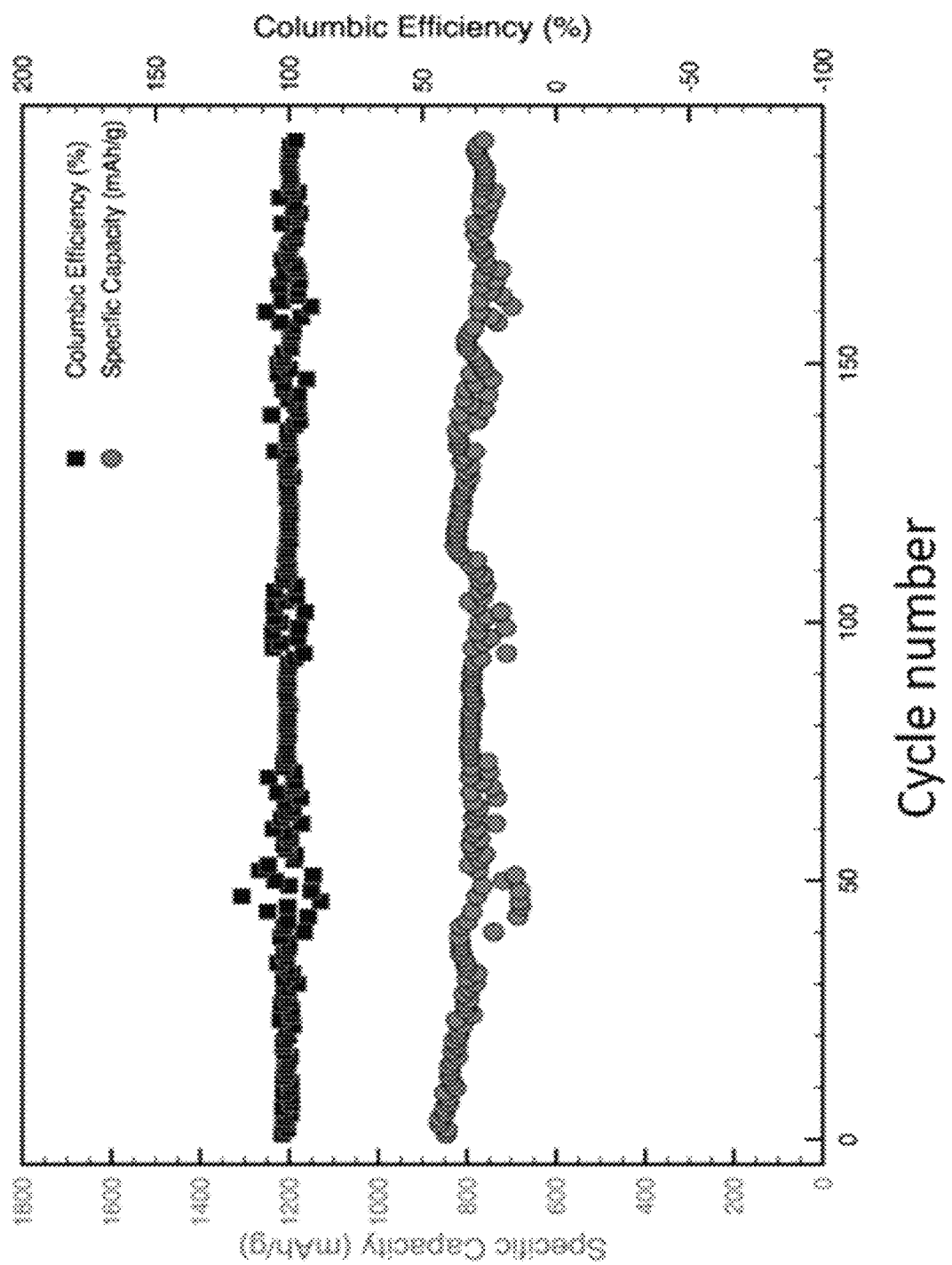
FIG. 3 is a plot of electrochemical performance of samples produced using graphene nanoplatets (GNPs) as a graphene source, according to embodiments.

The electrochemical performance of a sample prepared according to Example 2 (i.e., using GNPs as a graphene source) was tested. This sample also exhibited excellent stability during the charge/discharge process. Even when testing the sample at high current densities of 1 C for charge/discharge, the capacity of the sample remained close to the initial capacity after 200 cycles (see FIG. 3).

Experimental Results Discussion

FIGS. 4a and 4b show high-resolution X-ray photoelectron spectroscopy (XPS) N s spectra for a) GO/PEI/S; and b) r-GO/PEI/S, respectively, according to some implementations. The XPS results of FIG. 4a show that chemical bonds were formed between PEI and GO during the initial mixing process. The deconvolution of N 1S spectra of PEI-GO/S (FIG. 4a) indicates the presence of three different chemical interactions of the N atom with binding energies of 398.8, 400.1, and 401.2 eV, respectively, corresponding to the amide linkage (—N—C═O) (44.5%) between the amine group of PEI and —O—C(═O)— group of GO, free amino group (—$NH_2$), (49.7%) in the PEI and the protonated amine (5.9%), respectively. Peak P1 represents the amide bonds between PEI and GO; P2 represents the free amino group of PEI; and peak P3 represents protonated amine of PEI. These two groups of PEI can chemically interact with partially positively charged Li and partially negatively charged S of the LiPS to mitigate dissolution of LiPSs. The amide bonds produce a cross-linked network of GO/PEI with an extremely large specific surface area to accommodate more sulfur. Furthermore, the cross-linked structure can provide mechanical strength and void space to buffer the volume change of sulfur during the battery charge/discharge process.

Upon hydrothermal treatment of PEI-GO/S, some of the amide bonds break at high temperature as can be observed from the decreased intensity of the peak corresponding to amide linkages (18.9%) at 398.7 eV and increased intensity of the peak corresponding to amino groups (60.8%) at 400.2 eV in the deconvoluted N 1S spectra of PEI-rGO/S (FIG. 4b). However, these remaining bonds can help to enhance the mechanical integrity of the cathodes. The amide linkages can foreseeably help to connect the individual rGO sheets to form a physically cross-linked rGO network. The peak intensity at 401.1 eV corresponding to the protonated amine (21.1%) increased in the PEI-rGO/S composite. The increased amount of protonated amine groups can be attributed to the self-disproportionation reaction of sulfur in water resulting in the formation of sulfate ions and protons in the solution. The intensities of free amino groups (P2) and protonated amine (P3) increase after reaction, respectively. The free amino groups (P2) and protonated amine (P3) can effectively mitigate the dissolution of S by interactions with partially positively charged Li and partially negatively charged S of the LiPSs.

The deconvolution of the C 1S spectra of the PEI-rGO/S is shown in FIG. 4c, which shows the presence of C atom with four major different chemical environments. The peaks with the binding energies of 284.6, 285.8, 288.3, and 290.9 eV correspond to the —C═C— (33%), C—N/C—S (52.6%), —C═O, and/or —N—C═O (13.1%) and —O—C(═O)— (1.26%) linkages, respectively. The peak at 285.8 eV can be partially ascribed to the C—S bond formation between rGO and sulfur. The bond formation is believed to occur by the specific interaction in between the antibonding conjugated pi* states on the graphene plane of rGO and the lone pairs of the S 3pz 2 electrons.

The C—S bond formation was also supported by the deconvoluted peaks of S 2p (FIG. 4d) in the PEI-rGO/S composite. The XPS peak of S 2p can be deconvoluted into four major peaks with binding energies of 163.8, 165, 164.2, and 168.3 eV and a low intensity peak at 161.5 eV. The S—S bond energy of elemental sulfur is 400 eV. However, the slightly shifted binding energy peaks at 163.8 and 164.2 eV can be attributed to the C—S bond and C═S formation along with the S—S bonding of sulfur in the PEI-rGO/S composite. The formation of C═S bond clearly indicates the reaction between the —C(═O)— group of the modified GO and the sulfide ions formed from the self-disproportionation reaction of sulfur during the hydrothermal reaction. The binding energy peak at 165 eV can be attributed to the formation of S═O bonding, also indicating bond formation between the native oxygen in rGO and sulfur. The higher binding energy peak at 168.3 eV can be attributed to the sulfate species in the composite. The weak binding energy peak at 161.5 eV can be attributed to the presence of very small amount of S2-species in the PEI-rGO/S composite.

To briefly summarize this analysis, XPS confirms the formation of amide linkages between the surface —COOH functional groups of GO/rGO and the —NH2 group of PEI, which help the individual GO/rGO sheets to be physically cross-linked and the presence of free amino group and the protonated amine group can provide multidentate interaction sites to polar LiPSs. Moreover, the hydrothermal treatment also caused some chemical bond formation (C—S/C═S) between the sulfur and rGO, also suggesting strong interaction between the rGO and the anchored sulfur to it. All these combine to give one of the most stable cathodes.

From the morphological and structural analyses, the sulfur impregnation mechanism on the PEI-rGO network can be explained considering both hydrophobic-hydrophobic interaction between molten sulfur and hydrophobic domain of rGO, as well as chemical interaction between sulfide ions generated from the partial self-disproportionation reaction of sulfur during the hydrothermal reaction and the residual functional groups of rGO. Sulfur has a melting point of 112.8° C. and a liquid-liquid transition point of 159.4° C. During the hydrothermal reaction, sulfur melts at high temperature and high pressure and the hydrophobic liquid sulfur formed could diffuse through the hydrophobic pores of the rGO and solidify in the form of amorphous sulfur on cooling.

The cyclic voltammetry (CV) plots of the PEI-rGO/S (75.7%) cell (FIG. 5a) at a scan rate of 0.05 mV s$^{-1}$ show a pair of anodic peaks around 2.35 and 2.43 V and a pair of cathodic peaks around 2.3 and 2.0 V, which are typical of Li—S cells with carbon-sulfur composite cathodes. The anodic peak pair is corresponding to the oxidative conversion of Li2S to long chain LiPSs and then LiPSs to sulfur, and the cathodic peak pair corresponds to the conversion of sulfur to Li2Sn (4<n<8) and finally to Li2S2/Li2S. In the CV plots, the peak positions are constant for all five cycles indicating a steady and reversible redox reaction of the sulfur in the cathode.

The redox peaks observed in the CV plot resemble the charge-discharge plateaus obtained from the charge-discharge profile of the PEI-rGO/S composites especially at low currents. The comparative charge-discharge profile of the three PEI-rGO/S composites (containing 62.7%, 69.7%, and 75.7% sulfur) at 0.06 C for moderate sulfur loading of ≈2.7 mg cm$^{-2}$ was performed. The different specific capacities from the second discharge were obtained as 1131, 1110, and 1084 mAh g$^{-1}$, respectively, indicating 67.6%, 66.4%, and 64.8% utilization of the active sulfur component, respectively. The high utilization of the sulfur with a moderate sulfur loading (≈2.7 mg cm$^{-2}$) can be attributed to its uniform impregnation of sulfur within the cross-linked, high surface area conductive rGO network facilitating the charge transfer process.

Figures 5A, 5B, 5C, 5D:
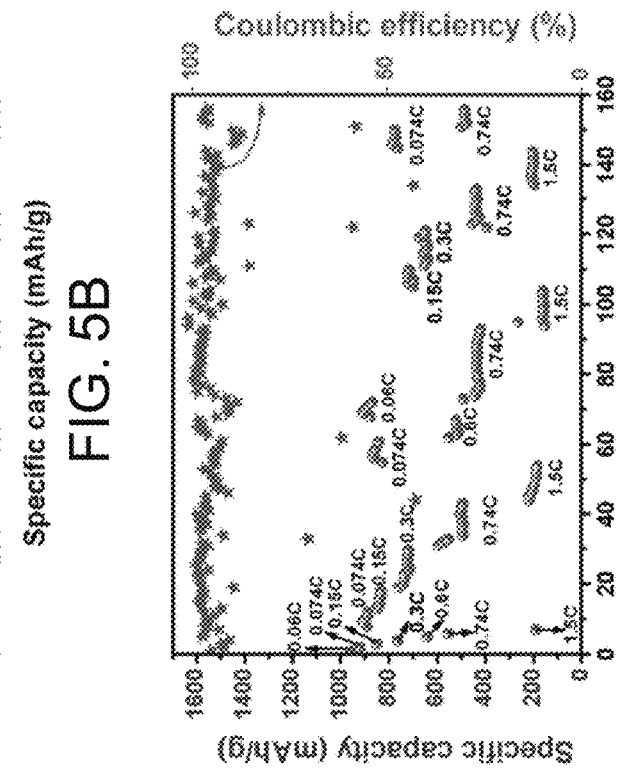
FIGS. 5A-5D show (a) CV plot of PEI-rGO/S (75.7%) at 0.05 mV s$^{-1}$ scan rate; (b) charge-discharge voltage profile of PEI-rGO/S (75.7%) at different C rates with 2.9 mg cm$^{-2}$ sulfur loading; (c) variation of specific capacity as a function of S loading at different C rates for the PEI-rGO/S cells; and (d) rate capability testing of PEI-rGO/S (75.7%) at different C rates for different cycles with high sulfur loading of 4.2 mg cm$^{-2}$, according to embodiments.

FIG. 5b shows the voltage profile of PEI-rGO/S (75.7%) at the sulfur loading of ≈2.9 mg cm$^{-2}$ at different C rates (0.06-1.5 C). A high specific capacity of 1000 mAh g$^{-1}$ was observed at discharge rate of 0.06 C and it retained 66.8% of this capacity at a high discharge rate of 0.74 C. The rate capability and stability were further analyzed using the capacity contribution from the upper discharge plateau (QH) and the lower discharge plateau (QL). These parameters were recently introduced as a method to analyze the type of sulfur species lost during cycling. The theoretical value of the QH reflects the conversion of solid sulfur to higher order soluble polysulfides, which corresponds to 419 mAh g$^{-1}$, and the QL reflects the conversion of higher order polysulfides to insoluble polysulfides. If one considers the end product to be Li2S2 then QL=837.5 mAh g$^{-1}$ or for full conversion to Li2S it becomes QL=1256 mAh g$^{-1}$. Thus, QL/QH=3 for full conversion to Li2S while conversion to Li2S2 leads to QL/QH=2. The electrodes analyzed in FIG. 5b showed 64.6% (270.5 mAh g$^{-1}$) of the theoretical QH at 0.06 C discharge rate and at high discharge rate of 0.75 and 1.5 C the cell showed 57.3% and 48.7% of the theoretical QH, respectively. While the cell showed excellent stability regarding the capacity contribution from QH, comparatively lower QL was observed (QL of 58% and of 34% of theoretical at 0.06 and at 0.74 C, respectively.) For the PEI-rGO/S (75.7%), a high QL/QH of (2.69-1.86) was determined at low discharge rates of (0.06-0.6 C) indicating the effective utilization of the redox species during the discharge at low discharge rate. However, at high discharge rate (1.5 C) a significant drop in the QL to QH ratio to ≈1.1 was observed due to a significantly reduced QL.

Figure 7A:
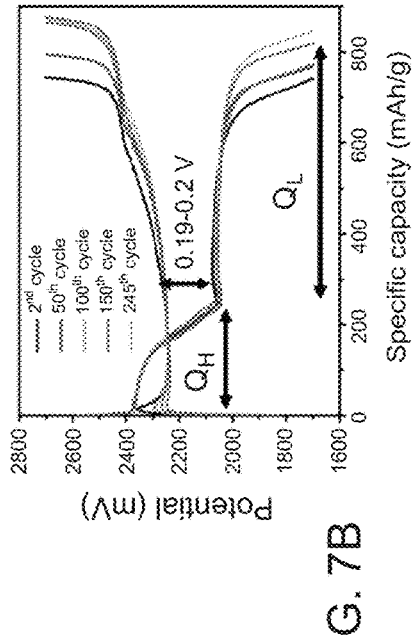
FIGS. 7A-7H show (a) cycle life performance of PEI-rGO/S (62.7%) at 0.15 C, PEI-rGO/S (69.7%) at 0.75 C, and PEI-rGO/S (75.7%) at 0.75 C discharge rate; (b) charge-discharge voltage profile of PEI-rGO/S (62.7%) at different cycle numbers at 0.15 C; (c) variation of specific capacities obtained from upper and lower discharge plateau; and (d) their retention rate (%) as a function of cycle number for the PEI-rGO/S cathodes; (e) digital images of different parts of the decrimped PEI-rGO/S (75.7%) cell after cycling at 0.75 C for 810 cycles; SEM cross-section micrograph of (f) used lithium anode after 810 cycles showing the passivation layer; (g) high magnification image of the passivation layer; and (h) EDS analysis on the passivation layer on Li metal, according to embodiments.

The variations of specific capacity as a function of sulfur loading for all three PEI-rGO/S composites at different C rates are shown in FIG. 5c. For all three kinds of cells, the initial discharge capacities at the lowest current density studied (0.06 C) ranged from 1150-950 mAh g$^{-1}$ for different sulfur loadings of ≈2.7-5.4 mg cm$^{-2}$. It was observed that the gradual increase in S/C ratio in the PEI-rGO/S cathodes starting from PEI-rGO/S (62.7%) to PEI-rGO/S (75.7%) with moderate (≈2.7-4.2 mg cm$^{-2}$) sulfur loading in the cathode did not affect the specific capacities much and the variation of specific capacities for each composite as a function of sulfur loading was nearly constant. However, with a higher sulfur loading of 5.4-5.6 mg cm$^{-2}$ a roughly linear decrease in specific capacity was observed on increasing the sulfur content in the PEI-rGO/S composites, which is expected based on the insulating nature of sulfur. Noteworthy to mention that all the capacities reported in FIG. 5c were from the initial cycles. Sometimes the capacity difference obtained at similar C rate does not follow the same trend for different sulfur loaded cathodes. This is likely attributed to two reasons. First, some variability from sample to sample (even at the same composition) was observed and showing all of these results illustrates what this is. The second possible reason is because of the slow activation of sulfur, which requires a number of cycles to show a stable performance for such a high sulfur loaded cathode. This was confirmed from the gradual increase in capacity cycle life analysis, as discussed later (FIG. 7a). The r-GO/PEI/S nanocomposites have an outstanding rate capability and reversibility with a high sulfur loading of ~4.2 mg/cm$^{-2}$ (at 75.7 wt. % sulfur), and with specific capacities of 957, 920, 851, 763, 641, 516, and 191 mAh/g for discharging rates of 0.06 C, 0.074 C, 0.15 C, 0.3 C, 0.6 C, 0.75 C and 1.5 C, respectively. As shown in FIG. 5d, the PEI-rGO/S cathode at high loading (4.2 mg cm$^{-2}$) and the highest sulfur content (75.7 wt %) exhibited excellent reversibility after many repeated cycles at different currents. Cycle stability at constant rate later is illustrated below, and this experiment is more aggressive and allows for the effect of cycle stability and rate combined to be observed. Different specific capacities of 957, 920, 851, 763, 641, 552, and 191 mAh g$^{-1}$ were recorded for the first seven cycles carried out at different discharge rates of 0.06, 0.074, 0.15, 0.3, 0.6, 0.74, and 1.5 C, respectively (discharge current densities ranging from ≈0.42 to ≈10.4 mA cm$^{-2}$). After different C-rates were explored over 55 cycles, when the discharged rate is suddenly decreased from 1.5 to 0.074 C, the cell recovers the most of its initial capacity at the same C-rate. A capacity decay of only 14% (146th cycle), 11% (120th cycle), and 9% (151st cycle), for C-rates corresponding to 0.06, 0.15, and 0.74 C, respectively, was observed.

Figure 6:
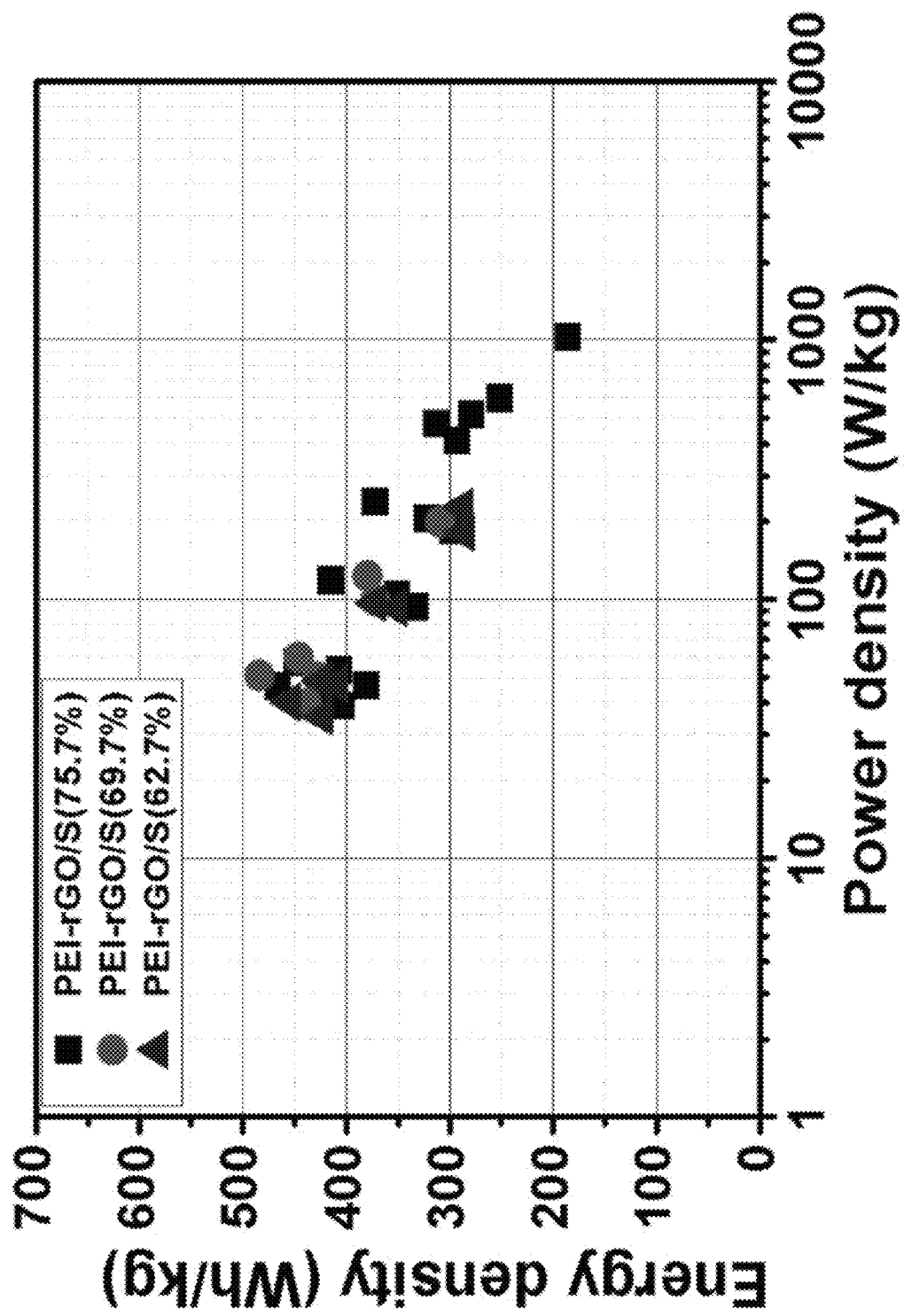
FIG. 6 is a plot of energy density versus power density for r-GO/PEI/S for various sulfur contents (62.7%, 69.7% and 75.7%), according to embodiments.

The predicted maximum specific energy of the nanocomposite, taking into account the active and inactive components of the battery, is 407 Wh/kg for a sulfur content of 69.7 wt. %, as shown in FIG. 6 (depicting a plot of energy density versus power density for r-GO/PEI/S for various sulfur contents (62.7%, 69.7% and 75.7%)).

The cycle stabilities of the PEI-rGO/S (62.7%), PEI-rGO/S (69.7%), and (PEI-rGO/S (75.7%) based cathodes at sulfur loading of ≈3.4 mg cm$^{-2}$ and at respective discharge rates of 0.15, 0.75, and 0.75 C are shown in FIG. 7a. The composites exhibited excellent stability during the charge/discharge process. For all three cathodes with increasing the cycle number, an initial increase in specific capacity was observed, which can be attributed to the activation of the sulfur during the initial redox process and subsequent rearrangement of the intermediates to electrochemically favorable positions. Starting from an initial discharge capacity of 735 mAh g$^{-1}$ for the PEI-rGO/S (62.7%), the cell reached a maximum specific capacity of 856 mAh g$^{-1}$ after 138 cycles and after 250 consecutive cycles, it retained almost 100% of its initial specific capacity and at a high coulombic efficiency of >90%. Even after hundreds of cycles, the composites still presented stable performance (737 mAh/g for 62.7 wt. % of sulfur at ~0.15 C after 250 cycles, 497 mAh/g for 69.7 wt. % of sulfur at ~0.73 C after 465 cycles, and 343 mAh/g for 75.7 wt. % of sulfur at ~0.74 C after 810 cycles). These results demonstrate that the unique r-GO/PEI/S nanocomposite effectively mitigates the dissolution of LiPSs and leads to an extended cycle life. Without wishing to be bound by theory, this exceptional cycle-life is attributed to interactions between the PEI which has free amino and protonated amine unites and LiPSs. The cross-linked structure, having a high mechanical strength, can also buffer the volume change of sulfur.

Figure 7C:
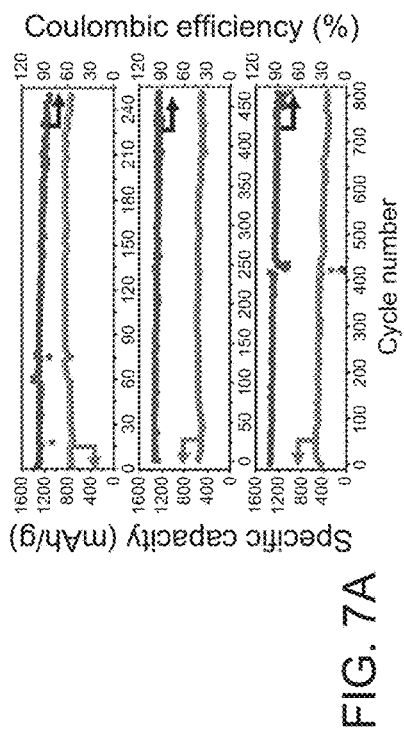
Figure 7B:
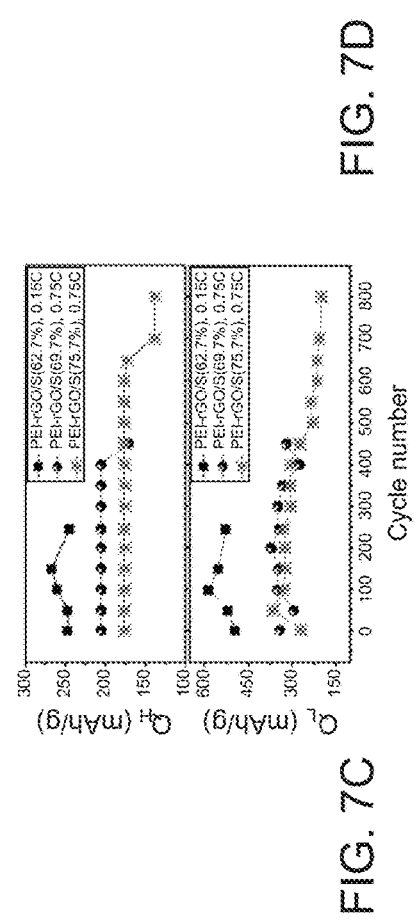

The voltage profile of the charge-discharge curves for different cycles of the PEI-rGO/S (62.7%) cell during continuous cycling is shown in FIG. 7b. The excellent reversibility of the cell was also confirmed from the low voltage hysteresis between the charge-discharge at different cycles. The voltage hysteresis between the charge and discharge cycle at discharge specific capacity of 315 mAh g$^{-1}$ was determined to be 0.191, 0.188, 0.205, and 0.203 V, respectively, for 2nd, 50th, 150th, and 245th cycles at 0.15 C rate. The very low polarization of the cell and the small polarization increase of only 0.012 V after 245 cycles indicate the cell's excellent stability and reversibility.

The high cycle stability trend was also observed at high currents. At a discharge rate of 0.75 C and with an initial discharge capacity of 547 mAh g$^{-1}$, the PEI-rGO/S (69.7%) cells showed a very stable cycle life with only 0.019% specific capacity loss per cycle after 465 consecutive charge and discharge cycles with an impressive coulombic efficiency between 95 and 100% throughout the cycles. The cycle life testing was continued for PEI-rGO/S (75.7%) at 0.75 C discharge rate for an even longer period. The cell showed an initial increase in capacity up to the first 40 cycles with a maximum capacity of 545 mAh g$^{-1}$ and showed high cycle stability with only 0.013% capacity loss per cycle after 660 cycles (specific capacity of 406 mAh g$^{-1}$) and 0.028% specific capacity loss per cycle after a total 810 cycles. While a comparison to the initial cycle is often done, a maximum specific capacity is achieved at the 40th cycle, and using this capacity to define the capacity loss per cycle, the values become 0.041 and 0.048% after the 660th and 810th cycle, respectively. To further understand the role of PEI on cycle stability, a control study was carried out with only rGO/S composite cathode without PEI. The control electrode material (rGO/S) was prepared in the same method as the PEI-rGO/S material with the exception of using a divalent metallic ion for the purpose of flocculating the GO sheets (0.1 m ZnCl$_2$ was used). After thoroughly washing to remove excess ZnCl$_2$, the material underwent hydrothermal treatment, followed by washing and drying. With a sulfur loading of ≈2 mg cm$^{-2}$, the rGO/S composite showed an initial capacity of ≈720 mAh g$^{-1}$ at 0.6 C and 0.106% capacity loss per cycle after 180 consecutive cycles. Even with a lower sulfur loading, the capacity loss per cycle for the rGO/S composite cathode is much higher compared to that of PEI-rGO/S composites. Similarly, it was observed that there was low cycle stability of hydrothermally synthesized sulfur anchored graphene composite (0.485% capacity loss per cycle at 0.2 C rate).

Figure 7D:
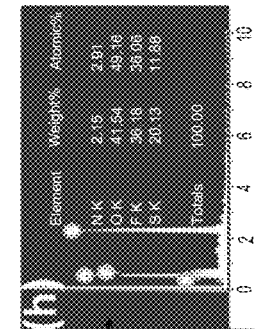

To better understand the cycle stability of the different PEI-rGO/S composites, the QH, QL, and the retention rates of the two capacities, QH (RQH) and LH (RQL), were analyzed as a function of cycle number and are shown in FIGS. 7c and 7d, respectively. Interestingly, all the cells showed excellent stability in the upper discharge plateau, as almost no capacity fading was observed over long term cycling (<400-600). This clearly indicates the strong interaction between the PEI-rGO host and the LiPSs resulting in the retention of the LiPSs within the cathode scaffold. The observed change in capacity was mainly from the lower discharge plateau. The ratio of QL to QH, which determines the effective utilization of the redox species during the discharge, was found to be as high as ≈2-2.25 for the PEI-rGO/S (62.7%) composites during the 250 consecutive cycles tested at 0.15 C. The PEI-rGO/S (69.7%) and the PEI-rGO/S (75.7%) composites cathodes also showed high efficiency (≈1.7-1.9) over a large number of cycles (≈350 cycles) at a higher discharge rate of 0.75 C. The relatively lower efficiency might be associated with the combined effect of the higher loading of insulating sulfur and the sub-optimal conductivity of hydrothermally reduced graphene leading to the ineffective utilization of the redox intermediates at high current before hitting the lower voltage limit in the measurement.

To further support the strong interactions between the polysulfides and PEI-rGO host, polysulfide adsorption study of both rGO/S and PEI-rGO/S was carried out with a 5×10$^{-3}$ m Li2S6 solution in a 1:1 (V/V), 1,3-dioxolane/1,2-dimethoxyethane (DOL/DME) solvent. Digital images of the adsorption test after 3 h of stirring were taken. The color change found in the supernatant of the control electrode material can be attributed to the redox reaction of the polysulfides present in solution with the sulfur present in the electrode material. It is clear that without the polycationic PEI, the polysulfides easily diffuse from the cathode. However, with the PEI-rGO/S material, while some sites on the polymer are likely occupied by the cross-linking of the rGO sheets, many amine groups are also available for binding with polysulfides, allowing it to retain all the sulfur originally within the electrode material as well as also capturing the additional polysulfides present in the stock polysulfide solution, yielding a very clear supernatant.

In FIG. 8a, the cycle stability of our PEI-rGO/S composites cathodes with the recent literature focusing on the development of stable cathodes is compared. As shown, in most cases, cycle stabilities were examined at low sulfur loading of <2.5 mg cm$^{-2}$. For several cases, moderate cycle life has been reported with higher sulfur loading of ≈3.0-4.5 mg cm$^{-2}$. The cycle stabilities of the PEI-rGO/S cells with sulfur loading of ≈3.4 mg cm$^{-2}$ and cycle number (250-810) are among the best results in terms of stability.

The improved cycle stability can be attributed to the PEI assisted cross-linked host architecture with multidentate interaction sites with the polar LiPSs. The cross-linked flexible rGO network is capable of providing mechanical stability against the volume change of sulfur during the redox process. On the other hand, the free amino and protonated amine unit of PEI in the PEI-rGO/S composite can chemically interact with the LiPSs during the battery operation and provide excellent stability to the cathode by preventing the LiPSs shuttling.

Figures 7E, 7F, 7G, 7H:
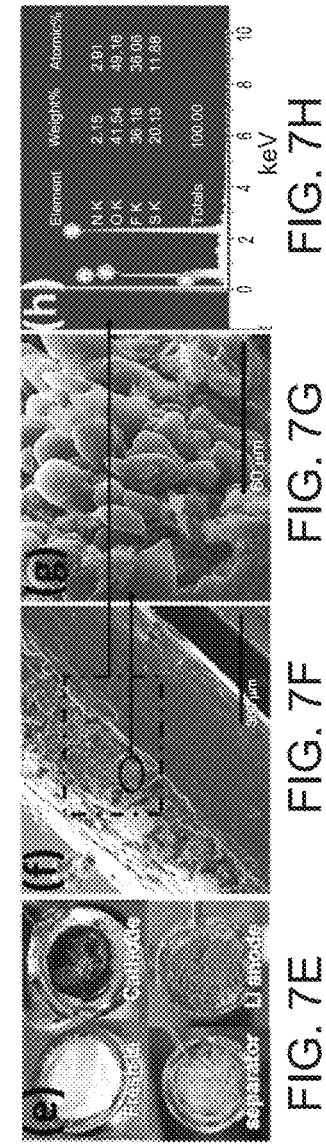

Throughout the cycles, the PEI-rGO/S (75.7%) cell maintained a high coulombic efficiency >95% for the first 500 cycles (FIG. 8a). However, after 775 cycles, the coulombic efficiency dropped below 90%. In order to analyze the drop of specific capacity and the coulombic efficiency after 810 cycles, we decrimped and analyzed the cell. The digital images of a fresh Li metal, Li metal anode after 810 cycles, the cathode, and the separator are shown in FIG. 7e. A thick grey mossy film can be found on the surface of the cycled Li metal and the cross-sectional SEM images (FIGS. 7f and 7g) show that the thickness of the mossy layer is ≈60-100 μm. This layer is formed by dendritic outgrowths of lithium covered with decomposed electrolyte known as the solid electrolyte interface (SEI). This SEI acts as a solid-state Li-ion conductor that facilitated charge transport, but the high surface area covered by the SEI can consume a significant amount of the electrolyte within the cell. Porous lithium is known to grow due to the instability of the SEI that forms on the initially flat lithium metal surface. During charging and discharging, this layer breaks and causes the nonuniform plating of Li metal back onto the anode. This layer becomes thicker and more porous with each cycle. EDS analysis of this layer indicates the presence of N, O, F, and S, where the atomic ratio of S to F is (1:3.03), which is approximately the atomic ratio of S to F (1:3) in LiTFSI, one of the lithium salts used. This suggests that the mossy layer of SEI-coated lithium is composed of mainly the electrolyte and not from LiPSs. Upon reassembling the cell with fresh Li and electrolyte, the cathode continued cycling with 95-100% Coulombic efficiency suggesting that the capacity fading was due primarily to anode-related problems.

The electrochemical impedance spectroscopy (EIS) analysis of the cells with three different sulfur contents after fully charging at 2.7 V and the PEI-rGO/S (69.7%) after 465 cycles was performed. In the equivalent electrical circuit, $R_s$, $R_f$, $R_{ct}$, CPE, and W represent the total internal resistance (the resistance of electrolyte, electrode, and separator), the resistance of the SEI layer, charge transfer resistance, constant phase element, and Warburg impedance, respectively. The internal resistance and the total resistance ($R_t$) arising from the SEI layer formation and the charge transfer were measured. An increased $R_t$ was observed on increasing the sulfur content, which is expected based on the insulating nature of sulfur. However, the long term cycling of the PEI-rGO/S (69.7%) cell resulted in an approximately three-fold increase in $R_t$. The increased charge transfer resistance over long term cycling can be attributed to the electrolyte depletion at the Li metal anode and the increased impedance of the thick, porous SEI layer.

The practical energy density (E) of the as fabricated PEI-rGO/S cathodes against a Li metal anode battery was approximated by introducing a correction factor (F) to account for the inactive components in a battery, $$E = F \cdot Q_c \cdot U$$

where $Q_c$ and U are the cathode capacity and approximate average cell potential (2.15 V), respectively. The correction factor was determined by considering the mass of cell components (f∞ in mg mg$^{-1}$ sulfur), which scale with sulfur loading (t) and those that do not (f$_0$ in mg cm$^{-2}$) according to $$F = \frac{t}{f_\infty t + f_0}$$

This represents the wt % of sulfur in a hypothetical cell. The parameter f∞ considers the amount of electrolyte, binder, conductive additive, or the minimum amount of lithium requires (0.43 mg mg$^{-1}$ of sulfur) for a given loading of sulfur while f$_0$ considers the mass of fixed components such as current collectors and membrane separator. The estimated practical specific energy of the PEI-rGO/S cells with different sulfur content and loading at discharge rate of ≈0.074 C are shown in FIG. 8b. A nearly linear increase in energy density was observed when the sulfur loading was increased from ≈2.7 to ≈4.2 mg cm$^{-2}$. However, the energy density appears to reach a plateau around ≈5.4-5.6 mg cm$^{-2}$, and the maximum energy densities of 378, 376, and 367 Wh kg$^{-1}$ were obtained for the PEI-rGO/S (62.7%), PEI-rGO/S (69.7%), and PEI-rGO/S (75.7%), respectively. Interestingly, all the cells showed comparable energy density with similar sulfur content. This is because when t is small, f∞ (which includes the carbon additive) is less important. To understand the optimum sulfur content and loading to maximize the specific energy, we plot the projected energy density as a function of charge/discharge rate (FIG. 8c). For all the cells, the maximum specific energy at low discharge rate (0.06-0.074 C) was shown by the highest sulfur loaded cathodes (5.4-5.6 mg sulfur per cm$^{-2}$). The maximum specific energy of 407 Wh kg$^{-1}$ was obtained for the PEI-rGO/S (69.7%) at 0.06 C with 5.4 mg cm$^{-2}$ sulfur loading. The PEI-rGO/S composite with the least sulfur content (62.7%) and at the highest sulfur loading (5.4 mg cm$^{-2}$) showed the highest specific energy at each discharge rate (0.06-0.75 C). However, for the PEI-rGO/S (69.7%) and PEI-rGO/S (75.7%), the increasing sulfur content resulted in a faster decrease in specific energy at higher discharge rate (>0.15 C) for similar sulfur loaded cathodes. Unlike the PEI-rGO/S (62.7%), for the PEI-rGO/S (69.7%) and PEI-rGO/S (75.7%) cathodes, the highest specific energy at higher discharge rates (tested up to 0.75 C) was obtained at a moderated sulfur loading of ≈4.1-4.2 mg cm$^{-2}$. The PEI-rGO/S (75.7%) electrode with sulfur loading of ≈4.2 mg cm$^{-2}$ showed high practical energy density of 368.2 Wh kg$^{-1}$ at 0.06 C and at a high discharge rate of 0.75 C it maintained energy density of 200 Wh kg$^{-1}$, which is highest among all the investigated cathodes in this work.

Experimental Procedures

Synthesis of GO: GO was synthesized by Tour's improved Hummer's method. In a typical synthesis procedure, 3 g of graphite was mixed with a mixture of 360 mL concentrated H$_2$SO$_4$ and 40 mL concentrated H$_3$PO$_4$ in a round bottom flask. To this suspension, 18 g of KMnO$_4$ was added slowly while stirring and the temperature maintained below 35° C. Stirring was continued for 16 h at 45° C. The thick mixture was cooled and diluted with 400 mL of deionized (DI) water in an ice bath. 5 mL H$_2$O$_2$ (30%) was added drop-wise to the suspension and a change in color from dark brown to golden yellow was observed. This GO was collected by centrifugation and washed twice with 10% HCl and thrice with ethanol. Finally, the GO was dispersed in water and dialysed.

Synthesis of Composite Hybrid:

A solution of sulfur dissolved in DMSO (40 mg mL$^{-1}$) was quickly injected into a 1 mg mL$^{-1}$ dispersion of GO in DI water while stirring and left under stirring for 1 h. The pH of the suspension of GO/S in DMSO/water mixture was maintained around 8 by adding 0.2×10$^{-3}$ mNaOH solution. PEI in DI water at a concentration of 15 mg mL$^{-1}$ was added drop-wise to the GO/S suspension while stirring until all the GO was flocculated by the PEI and the solution surrounding the flocs became clear. The dispersion was kept undisturbed for 24 h and then washed with water several times to remove the organic solvent, NaOH, and excess PEI and then transferred to 100 mL Teflon lined stainless-steel autoclave and heated at 180° C. for 18 h. The black precipitate was collected and washed several times with DI water and dried to yield the final PEI-rGO/S composite. Three different composites were synthesized by varying the weight ratios of GO to sulfur of 1:1, 1:1.4, and 1:1.7 to obtain sulfur contents of ≈62.7%, ≈69.7%, and ≈75.7%, respectively, in the PEI-rGO/S composite. These samples will be referred to as PEI-rGO/S (62.7%), PEI-rGO/S (69.7%), and PEI-rGO/S (75.7%), respectively. The loading of PEI was found to be ≈5.7-8.7% in the final PEI-rGO/S composites.

Synthesis of Electrode:

PEI-rGO/S, carbon black, and polyvinylidene fluoride (PVDF) were uniformly mixed in a mass ratio of 70:20:10 in N-methyl-2-pyrrolidone (NMP) using a mortar and pestle and the prepared slurry was dried under vacuum. The dried powder was then pressed on precut Al foil discs using a stainless-steel die with sulfur loading of ≈2.7-5.6 mg cm$^{-2}$ and a tap density of ≈1.54 g cm$^{-3}$. The electrodes were assembled in an Ar filled glove box using CR2032 type coin cell using a polypropylene separator and ether based electrolyte (1:1 (V/V) 1,3 dioxolane and dimethoxyethane containing 0.2 m LiNO3 and 1 m LiTFSI) against a precut Li metal anode (Sigma Aldrich, 99.9% trace metal basis).

Polysulfide Adsorption Study:

Under ultrahigh purity (99.999%) Ar atmosphere, elemental sulfur and lithium sulfide (Li2S) were mixed in a stoichiometric ratio to obtain Li2S6 and 1:1 (V/V) DOL/DME solvent was added to the powder to create a 5×10$^{-3}$ m concentration of the polysulfide solution. The solution was mixed until the solids were fully dissolved. As a control experiment, an electrode without PEI was prepared by the same method as the PEI-rGO/S material but using a divalent metallic ion for the purpose of flocculating the GO sheets (0.1 m ZnCl$_2$ was used). After washing to remove excess ZnCl$_2$, the material underwent hydrothermal treatment, followed by washing and drying. Both the control and PEI-rGO/S material were prepared with a GO/S ratio of 1:1, yielding a final S fraction of about 62.7 and 8.7 wt % PEI. The dried electrode material was used in this test with about 4.5 mL of the polysulfide solution.

Characterizations of the Materials:

The sulfur and PEI content in the PEI-rGO/S composites were determined by thermogravimetric analysis (Q500, TA Instruments) by heating the sample under nitrogen atmosphere from 25 to 600° C. at a ramp rate of 5° C. min$^{-1}$. Raman analysis was carried out using a Horiba Jobin-Yvon HR800 Raman system equipped with an Olympus BX 41 microscope and a 532 nm laser. XRD analysis was carried out using Bruker D8 focus instrument (wavelength: Cu K-alpha 1, 0.15418 nm). XPS was carried out using Thermal Scientific K-598 Alpha XPS spectrometer, 150 eV. Morphological characterizations were carried out by field emission scanning electron microscopy (LEO 1550, Zeiss) with an accelerating voltage of 10 kV. Optical microscopy analysis was carried out using Leica DM 2700 M instrument. Electrochemical characterization was carried out by galvanostatic charge/discharge using a BTS3000 cycler (Neware). Cyclic voltammetry and EIS were carried out using a Biologic SP-300. The CV experiment was carried out after initial activation of the cell by charging and discharging at 0.06 C (1 C corresponds to 1675 mA g$^{-1}$ current considering 1675 mAh g as the theoretical specific capacity of sulfur) for two cycles. For the charge-discharge tests, the maximum charging current used was 2 mA cm$^{-2}$ to prevent current spikes which were attributed to "soft-shorts" by dendrite growth across the separator and which typically lead to more rapid failure.

As used herein, the terms "about" and "approximately" generally mean plus or minus 10% of the value stated, for example about 250 m would include 225 m to 275 m, about 1,000 m would include 900 m to 1,100 m.

While various embodiments of the system, methods and devices have been described above, it should be understood that they have been presented by way of example only, and not limitation. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of forming a nanocomposite cathode, the method comprising:
   combining a functionalized graphene with a first polar solvent to form a first mixture, the chemically functionalized graphene having a concentration in the first mixture of between about 0.5 mg/ml and about 10 mg/ml;
   adding a surfactant to the first mixture to form a first solution, the surfactant added in an amount sufficient to cause the functionalized graphene to be well-dispersed in the first solution, the surfactant including at least one of sodium dodecyl sulfate (SDS), sodium dodecyl benzene sulfonate (SDBS), polyvinylpyrrolidone (PVP), or polyvinyl alcohol (PVA);
   forming a second solution with an N-polymer and a second polar solvent;
   combining the first solution and the second solution with sulfur to form a second mixture; and
   heat treating the second mixture for about 6 hours to about 24 hours such that a crosslinked network having pore spaces forms between the N-polymer and the functionalized graphene, the heat treating forming a nanocomposite cathode and the crosslinked network having sulfur captured and evenly distributed in the pore spaces of the crosslinked network.

2. The method of claim 1, further comprising:
   chemically treating graphene to produce the functionalized graphene.

3. The method of claim 2, wherein chemically treating the graphene includes acid treatment.

4. The method of claim 1, further comprising:
   adding a conductive additive to the second mixture.

5. The method of claim 1, wherein the sulfur is elemental sulfur, and the combining the first solution and the second solution comprises:
   mixing the first solution and the second solution with a dispersed solution that includes the elemental sulfur.

6. The method of claim 5, further comprising:
   dissolving the sulfur in one of dimethyl sulfoxide (DMSO) or tetrahydrofuran (THF) to form the dispersed solution.

7. The method of claim 1, wherein the sulfur has a concentration from 20 mg/ml to 40 mg/ml.

8. The method of claim 1, wherein an N-polymer concentration of the second solution is from 1 mg/ml to 40 mg/ml.

9. The method of claim 1, further comprising:
adjusting a pH value of the second mixture to about 8.

10. The method of claim 1, wherein the combining the first solution with the second solution includes precipitating elemental sulfur from a sulfur-containing chemical reagent.

11. The method of claim 10, wherein the sulfur-containing chemical reagent is $Na_2S_2$.

12. The method of claim 10, wherein the precipitating is performed by a chemical redox reaction.

13. The method of claim 10, wherein a sulfur concentration of the sulfur-containing chemical reagent is from 20 mg/ml to 40 mg/ml.

14. The method of claim 1, wherein the heat treatment is performed in a controlled Ar atmosphere at a heat treatment temperature from 120° C. to 200° C.

15. The method of claim 1, wherein the forming the nanocomposite cathode is performed by a hydrothermal reaction at a reaction temperature from 130° C. to 240° C.

16. The method of claim 1, wherein the first polar solvent comprises deionized water.

17. The method of claim 1, wherein the second polar solvent comprises deionized water.

18. The method of claim 1, wherein the crosslinked network is a conductive crosslinked network.

19. A method of forming a nanocomposite cathode, the method comprising:
dispersing a functionalized graphene in a first polar solvent to form a first solution, the first polar solvent comprising a surfactant including at least one of sodium dodecyl sulfate (SDS) or sodium dodecyl benzene sulfonate (SDBS);
forming a second solution with an N-polymer and a second polar solvent;
combining the first solution and the second solution with sulfur to form a mixture; and
heat treating the second mixture for about 6 hours to about 24 hours such that a crosslinked network having pore spaces forms between the N-polymer and the functionalized graphene, the heat treating forming a nanocomposite cathode, and the crosslinked network having sulfur captured and evenly distributed in the pore spaces of the crosslinked network.

20. The method of claim 19, further comprising:
chemically treating graphene to produce the functionalized graphene.

21. The method of claim 19, further comprising:
adding a conductive additive to the mixture.

22. The method of claim 19, wherein the sulfur is elemental sulfur, and the combining the first solution and the second solution comprises:
mixing the first solution and the second solution with a dispersed solution that includes the elemental sulfur.

23. The method of claim 22, further comprising:
dissolving the sulfur in one of dimethyl sulfoxide (DMSO) or tetrahydrofuran (THF) to form the dispersed solution.

24. The method of claim 19, wherein the sulfur has a concentration from 20 mg/ml to 40 mg/ml.

25. The method of claim 19, wherein the crosslinked network is a conductive crosslinked network.

* * * * *